UNITED STATES PATENT OFFICE.

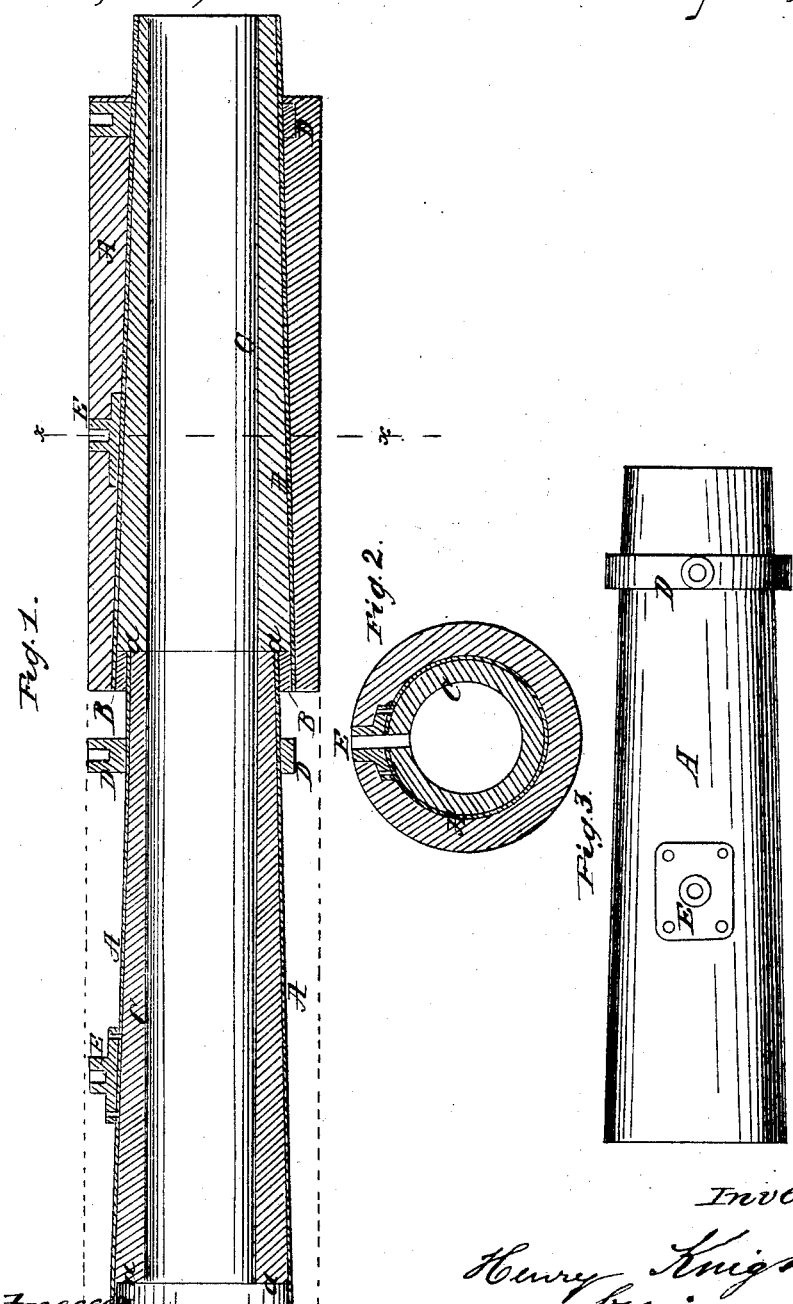

HENRY KNIGHT, OF BROOKLYN, NEW YORK.

IMPROVEMENT IN COMBINATION CEMENT AND METALLIC PIPES.

Specification forming part of Letters Patent No. 38,112, dated April 7, 1863.

*To all whom it may concern:*

Be it known that I, HENRY KNIGHT, of Brooklyn, in the county of Kings, and State of New York, have invented a new and useful Improvement in Combination Cement and Metal Pipes; and I do hereby declare that the following is a full, clear, and exact description of the same, reference being had to the accompanying drawings, forming part of this specification, in which—

Figure 1 is a vertical longitudinal section of my invention. Fig. 2 is a cross-section of the same. Fig. 3 is an exterior view of the metal portion of the pipe.

Similar letters of reference in the several figures indicate corresponding parts.

This invention relates to an improvement in the combination cement and metal pipe patented to me on the 27th August, 1861.

The nature of my present invention consists, first, in the construction of the jointing ends of one of the sections of every pair of sections, with a taper or conic form, so that when it is introduced into the socketed end of a joining-section a space for cement or other packing shall exist, the cement or other packing being introduced into th s space to make a water-tight and strong joint; second, in providing a means for facilitating the tapping of such combination cemet and metal pipes at points between the jointing ends of a section.

To enable others skilled in the art to make and use my invention, I will proceed to describe the same with reference to the drawings, and also to Letters Patent granted to me at previous dates on combination metal and cement pipes, and on machines for molding the same with a square socket at one end and a shoulder at the other end, to wit: patents dated May 14, 1861, August 27, 1861, February 25, 1862, May 13, 1862, April 8, 1862, and June 24, 1862.

In my former patent on combination cement and metal pipe the wrought-iron strengthening tube or frame embedded between inner and outer cement surfaces was made straight or of uniform diameter from end to end, and in connection with the same cast-iron hubs or bands were used at the joint in order to expedite the tapping operation.

In this, my new construction, the frame or strengthening tube A of the pipe, which is made of wrought-iron sheets or plates properly fastened by rivets or otherwise, I make of a conical form at one end, or along its whole length, as shown, the cone being truncated, the diameter of this conical tube being such at its respective ends as to leave precisely such difference in diameter between the larger and smaller end as I deem desirable for a joint recess, B, in which to insert and compress a packing of cement mortar or other suitable materials when two or more pipes are to be put together for use, which joint recess may be in general from one-fourth to three-fourths of an inch in width.

By the several processes, fully described in Letters Patent heretofore issued to me, I make the internal cement lining, C, of the pipe at one and the largest end with a shoulder, $a$, in general, three, four, or five inches from the end of the wrought-iron tube A. This shoulder regulates the depth of the joint-recess, it serving as the abutment for the smaller end of the next pipe-section inserted. The joint recess is properly filled in with cement mortar or other material, and is calked tight by proper instrument and pressure. The pipe being molded over a straight cylindric core, has an exactly cylindrical form on its interior. There might be the smallest possible deviation from a cylinder in order to facilitate drawing it over the core.

To enable pipes made and jointed in this way to be conveniently tapped, I construct the tube A, before putting it in the mold, with a metallic ring, D, of the general form shown in the drawings. This ring may be of a diameter to suit any part of the tube, and of any convenient thickness to suit the requisite depth and hold of ordinary water-taps after being drilled for that purpose, and to be conveniently built in and inclosed by the cement-mortar coating, in case such coating is used. The ring or rings may be of uniform section, or may be formed with one or more tapping bosses and connecting feathers.

Instead of rings I may insert through an opening previously made through the wrought-iron tube, or I may attach upon the tube a metallic thimble or tapping boss, E, so formed as to be conveniently riveted to said tube, to rest against it, or to be held by it under the pressure on the tap when in use, to admit the proper introduction of taper, bulge, or screw taps, usually inserted in water-pipes, and to be conveniently built in and inclosed by the cement-mortar coating and lining, as shown in the drawings.

By my invention a simple and effective joint is made between two or more lengths of pipe without the use of hubs or rings or of sleeves or bands of any kind at the joint. A very convenient means for tapping is also provided.

What I claim as my invention, and desire to secure by Letters Patent, is—

1. The application and use of wrought-iron frames or tubes of the form of a truncated cone at one end or along their whole length, to pipes lined or coated with hydraulic cement mortar, or both lined and coated, for the convenient jointing of the same in their several lengths, and at the same time retaining the cylindrical form and finish.

2. The application and use of metallic tapping rings, bosses, or thimbles to pipes of wrought-iron lined or coated with cement mortar, or both lined and coated, substantially in the manner and for the purpose described.

HENRY KNIGHT.

Witnesses:
SAMUEL McELROY,
JAMES CRAWFORD.